March 27, 1934.  J. E. GARDNER  1,952,369
SELECTING SYSTEM
Original Filed Aug. 6, 1927
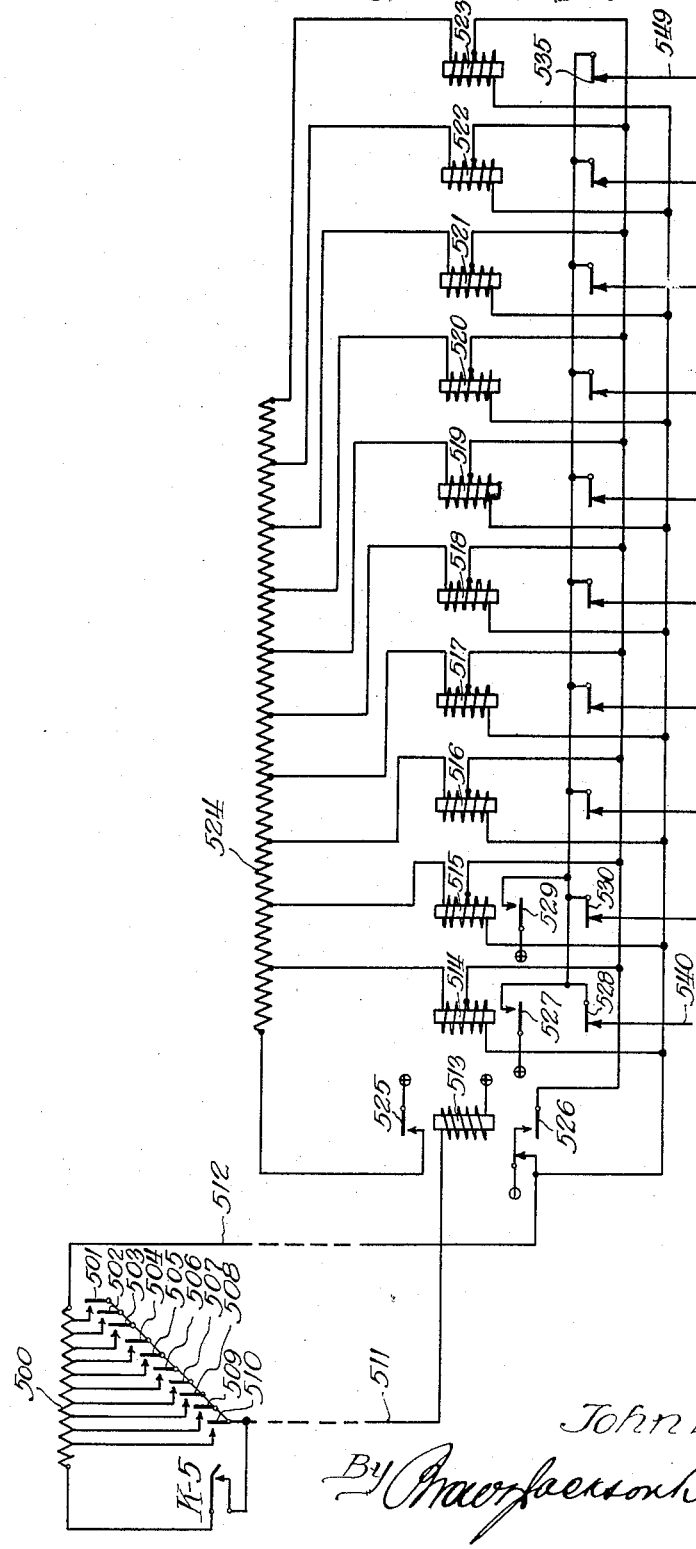
Inventor:
John E. Gardner.

Patented Mar. 27, 1934

1,952,369

UNITED STATES PATENT OFFICE 1,952,369

SELECTING SYSTEM

John E. Gardner, Clarendon Hills, Ill.

Original application August 6, 1927, Serial No. 211,101. Divided and this application September 16, 1931, Serial No. 563,090

8 Claims. (Cl. 177—353)

The present invention relates in general to selecting systems.

One of the objects of the present invention is to provide novel means for selecting instantaneously any one of a plurality of electro-responsive devices over a single circuit.

Another object is to provide a selecting system of this character of simple and inexpensive design.

Another object is to employ well known and standard equipment in the selecting system.

A further object is to provide a selecting system of this character that is not affected by varying battery voltages, inductive disturbances and the like.

There are other objects of my invention which, together with the foregoing, will be described in the detailed specification that is to follow, taken in conjunction with the accompanying drawing, and forming a part thereof.

In practicing my invention, I provide a plurality of electro-responsive devices and subject each device to at least two electrical forces. One of these electrical forces with respect to the various devices is graduated or graded, and I provide an electrical circuit common to all of the devices which may vary one of the eelctrical forces to produce a balance of electrical forces or their effects in the device that is to be selected. By setting up electrical interacting forces in the various electro-responsive devices, and controlling the variation of one force in each one of the devices, I provide means whereby it is possible to affect an electrical balance in any one of the devices over a single circuit. When one device in balanced, all the rest are in an unbalanced condition, and the only one that is selected is the one that is balanced.

In the present instance, I employ a plurality of differenial relays which may be wound in the usual manner with their windings all the same. This provides a relatively simple manufacturing problem that lends itself readily to quantity production. The opposing windings of the differential relay set up interacting magnetic forces upon the same core. This means that the magnetic forces set up are affected by the same characteristics of the iron core, and no provision need be made for the saturation curve of the core or its magnetic characteristics. By connecting these relays in a circuit supplied with energy from a single battery, the selecting action is not subject to variation of battery voltage or external electrical forces.

This application is a division of my co-pending application, Serial Number 211,101, filed August 6, 1927.

Referring now to the drawing, I have illustrated my invention by means of the usual conventional diagram.

In the drawing, the relays 513 to 523 inclusive may be of any usual or well known type. From the standpoint of cheapness, I have chosen to employ ordinary telephone relays. Relays 514 to 523, inclusive, are of the well known differential type, and are all alike. These relays may be wound with twin windings or upon opposite ends of the core. In either instance, the magnetic circuit of the relays is the same for each winding, and the magnetic effect set up by a given current flow in each winding will be the same, irrespective of the magnetization curve of the core. The upper windings of the differential relays are connected to a resistor 524 at points of graduated distance apart to provide for stepped current flow in the upper or balancing windings. That is, the upper winding of the relay 523 is connected to the point on the resistor 524, so that with a given battery voltage, a current flow of ten milliamperes, for example, is obtained, through the upper winding of the relay 523. The relay 522 is connected to the resistor 524 so that the current flow through its upper winding may be twenty milliamperes, for example. The connections of the remaining relays 514 to 521, inclusive, are made so that the current flow in the upper windings varies in like steps. The lower windings of the differential relays 514 to 523, inclusive, are connected in parallel, and extend to conductor 512 of the line circuit. The relay 513 is connected to the other line conductor 511. Relay 513 is initially energized to prepare the circuits of the selecting relays 514 to 523, inclusive, for operation. At the distant station from which it is desired to obtain the selection, a resistor 500 is provided, and a plurality of push buttons 501 to 509, inclusive. The contacts of the push buttons are connected to the resistor 500 in such manner as to include a certain portion of this resistor in the line circuit when they are operated. For example, the push button 501 is connected to the resistor 500 at such point that with a given battery voltage, the current flow in the line circuit including the lower windings of all the differential relays will be such that the current flow through the lower windings will be equal to the current flow in the upper windings of the relay 514. The contacts of the remaining push buttons are connected in a similar manner to the resistor 500, so that when any other push button is depressed, the current flow in the line circuit will be regulated to equal the current flow in the upper winding of the corresponding selecting relay. A key K5 is also provided at the sending station for completing the line circuit. This key may be of any usual or well known type.

The contacts of the selecting relays 514 to 523, inclusive, may be extended to registering or control relays to provide for any number of selections in the manner illustrated in my copending application, above referred to.

It will be obvious that the selecting relays 514 to 523, inclusive, may be connected in series instead of in parallel as in the present instance.

Having described the apparatus shown in the drawing, I shall now explain its detailed operation.

In order to do this, it will be assumed that the operator at the control station desires to bring about the selection of the relay 514. To accomplish this result he will operate the key K-5. As a result of this operation there is a circuit completed which extends from ground by way of relay 513, conductor 511 springs of key K-5, resistor 500, and normally closed springs controlled by armature 526 to battery. The relay 513 is energized over this circuit and operates to connect ground to one terminal of the resistor 524 at armature 525 to disconnect direct battery from the conductor 512 at the normally closed springs controlled by armature 526 and to connect battery to the mid-points of the differential relays 514 to 523, inclusive. As a result of the latter operation there is a new circuit established for the relay 513 which extends from battery by way of front contact in armature 526, to mid-points of all the differential relays 514 to 523, inclusive, thence through the lower windings of these relays in multiple, conductor 512, resistor 500 springs of key K5, conductor 511, and relay 513 to ground. Relay 513 is maintained energized over this circuit.

Since all the resistor 500 is present in the control circuit, all the differential relays are unbalanced, it being understood that there is a circuit for each selecting relay which extends from battery that has been connected to their mid-points through their upper windings and thence through the resistor 524 to ground by way of front contact and armature 525. It will be seen that the upper windings of the various relays are connected to the resistor 524 at certain points. These connections are made at such points as will bring about a variation in conduction of a predetermined amount in steps between each relay. With all of the resistance 500 connected in the control circuit, all of these relays are unbalanced and are, therefore, energized. Now since the operator at the control station desires to bring about the operation of the relay 514, he will operate the push button 501. By this operation a certain amount of the resistance 500 is introduced into the control circuit while the remainder of it is short-circuited. This alteration of conductance in the control circuit brings about an alteration in the current flow therein and through the lower windings of all the selecting relays. In only one relay will the current flow through the lower winding equal the current flow through the upper winding, for to explain a little more clearly, in only one relay will the current flow through the lower winding set up the same intensity of magnetic fields as the current flow through the upper winding. In view of the connections of the various relays, the relay 514 is the only one in which this condition prevails. The relay 514 is thus balanced and is deenergized while the relays 515 to 523, inclusive are all operated. A circuit is now completed which extends from ground by way of armature 529 and its front contact, armature 528 and its back contact to conductor 540. The connection of ground to this conductor brings about the operation of a registering relay or any other device that may be desired.

As soon as the push button 501 is released all the selecting relays are again energized. When it is desired to restore the selecting circuit to normal, the key K-5 is released and the circuit of the relay 513 is opened. Relay 513 is deenergized to restore the selecting circuit to normal.

It will now be assumed that the operator at the control station desires to bring about the operation of the relay 523. To accomplish this result he will depress the push button 510. By this operation a certain amount of the resistance 500 is introduced in the control circuit and the current flow through the lower windings of the various relays is immediately altered. In only one relay, however, will this current flow set up a magnetic field which is equal to the magnetic field set up by the upper winding. This is in the relay 523. The relay 523 is then the only one deenergized. All the selecting relays 514 to 522 are thereby operated. A selecting circuit or operating circuit is now completed which extends from ground by way of armature 527 and its front contact, armature 535 and its back contact to conductor 549. The connection of ground to this conductor may perform any desired function of a registering relay similar to those shown in my copending application above referred to.

It will be seen that all the selecting relays, as well as the control circuit, extending to the selecting station are connected to a single battery. Obviously any change in the potential of the battery will affect all the selecting relays equally, as well as the control circuit. This means that the instantaneous selection above described is independent of voltage variation within the operating limits controlled by the sensitivity of the selecting relays. Since the selecting action depends upon a balancing of opposed forces generated from a single source of current, it will be substantially independent of extraneous currents introduced in the circuit because the balanced relation will apply with respect to them.

Another important feature of the invention is that in the normal condition of the system, there is no current flow whatsoever. The operation of the key K5 serves to bring about the preparation of all the selecting circuits for operation. Furthermore, the throwing of the key K5 includes all the resistor 500 in the circuit which limits the current flow during the time the system is in operation.

A further important feature is that the selecting set-up is at all times under the control of the operator by opening the key K5.

The selecting relays are of relatively simple type uniformly constructed, and can be manufactured in large quantities. Since the opposing electrical effects at each selecting point are obtained on the same magnetic cores, the characteristics of the magnetic circuit for each selection are identical and can be disregarded. Consequently the relays may be cheaply constructed.

It will also be obvious that by the provision of changeover relays and registering relays, as illustrated in my copending application, and well known in the art, the number of selections that may be obtained by the present selecting arrangement may be any multiple of ten. It is also to be noted that the selection occurs instantaneously irrespective of the push button operated. The number of push buttons and number of selecting relays may be increased to any extent, depending entirely upon the voltage of the battery employed and the sensitivity of the selecting relays. That is, if selecting relays are employed sensitive to a change of say one milliampere, a very large number of selections can be obtained. The distance of the sending station from the selecting station is also immaterial, in view of the fact that a single selecting circuit is employed. The system is positive, since it does not depend upon tensioning of the relays or marginal operation in any sense.

While I have illustrated and described certain specific embodiments of my invention, I am aware that many changes, deviations, and modifications may be made therefrom without departing from the spirit and scope thereof, as indicated in the appended claims.

I claim:—

1. In a selecting system, the combination of a sending and receiving station, a single electrical circuit connecting said stations, a plurality of differential relays at said receiving station, a single source of electrical energy at said receiving station, means at said sending station for closing said circuit, means responsive to such closure for connecting said source of energy to said relays to energize all of them by magnetically unbalancing each relay, a plurality of push buttons at said sending station corresponding in number to the number of said differential relays at said receiving station and means including said source of energy operatively responsive over said circuit to the operation of any one of said push buttons for immediately magnetically balancing the corresponding differential relay to operate the same to the exclusion of the remaining relays to effect a selection.

2. In a selecting system, the combination of a sending station and receiving station, a single circuit connecting said stations, a plurality of differentially wound two winding relays at said receiving station, means at said sending station for closing said circuit, means responsive to such closure for energizing the first ones of the windings of said relays equally and energizing the second ones of the windings of said relays unequally to prepare said relays for operation, means controlled over said circuit for balancing the energization of the windings of a predetermined one of said relays to operate that relay, and means responsive to the opening of said circuit for rendering said relays inoperable.

3. In a selecting system, the combination of a sending and receiving station, a single circuit connecting said stations, a plurality of identical two winding differential relays at said receiving station, a plurality of push buttons at said sending station corresponding in number to the number of said relays, means for closing said circuit, means responsive to such closure for energizing the first ones of the windings of said relays equally and energizing the second ones of the windings unequally to prepare said relays for operation by operating all of said relays to prepare them for selective operation, means operative responsive to the operation of any number of said push buttons in succession to individually balance the energization of the windings of and to operate the corresponding relays in like succession to make a series of selections while maintaining said circuit closed.

4. In a selecting system, the combination of a sending and receiving station, a single circuit connecting said stations, a plurality of differential relays at said receiving station, each of said relays having two similar windings, means at said receiving station controlled over said circuit for energizing said windings to unequal magnetic strengths to unbalance all of said relays, and means controlled over said circuit from said sending station for successively balancing the magnetic strength of and operating any individual one of said relays.

5. In a selecting system, the combination with a sending and receiving station, a single circuit connecting said stations, a plurality of differential relays at said receiving station each having two windings, means for closing said circuit, means responsive to the closing of said circuit for preparing said relays for operation by energizing unequally the two windings of each relay, means at said sending station for altering the electrical current in said circuit while said circuit is maintained closed, such alteration balancing the energization of the two windings of an individual one of said relays to operate that relay to make a selection.

6. In a selecting system, the plurality of two winding differential relays, a resistor, a source of current, a line circuit, a control relay, means for connecting said control relay through said line circuit across said source of current to energize the same, circuit means completed by said energized control relay to connect one winding of each of said differential relays across said source of current in series with a part of said resistor, said part being different for each winding to energize the same to a particular magnetic strength which is different from the magnetic strengths of the others, means controlled by said energized control relay for connecting the second winding of each of said relays in multiple with each other between one side of said source of current and said line and in series with said line and relay to the other side of said source of current to energize said second windings to equal magnetic strengths, each of said differential relays being then unbalanced and operated, and means in said line circuit for varying the magnetic strength of said second windings to thereby balance the magnetic strength of one of said relays and operate the same independently of the others to effect a selection.

7. In a selecting system, a receiving station and a sending station, a line circuit extending between said station, a resistor, a key, and a plurality of push buttons at said sending station, a control relay, a plurality of two winding differential relays, a resistor, and a source of current at said receiving station, said key being operable to connect said control relay across said source of current in series with said line and sending station resistor to energize the same, means controlled by said energized relay to connect one winding of each of said differential relays in series with an individual part of said resistor across the terminals of said source of current to thereby energize said windings to different magnetic strengths, means also controlled by said energized relay for connecting the second windings of said relays in multiple with each other between one terminal of said source of current and said line and in series with said line, said key, said sending station resistor, and said relay to the other side of said source of current to energize said second windings equally, said differential relays being thereby unbalanced and operated to prepare selecting circuits, said push buttons being operable to short circuit a portion of said sending station resistor to vary the strength of current flowing through said line and second windings of said differential relay thereby to balance one of said relays and operate the same independently of the others to effect a selection.

8. In a selecting system, a sending station, a receiving station, a source of current at said receiving station, a line circuit connecting said stations, means at said sending station for closing said line circuit, a plurality of identical two winding differential relays, means controlled over said closed line circuit for connecting one winding of each of said relays across said source of current to energize said windings to one magnetic polarity, said means including adjusting means for making the magnetic strength of each one of said windings different from the magnetic strengths of the others, means also controlled over said closed line for connecting the second windings of said relays in multiple with each other and in series with said source of current and line circuit to energize said windings equally and to a magnetic polarity opposite from the first windings, each of said relays being magnetically unbalanced and operated, means controlled by said relays for preparing selecting circuits, and means at said sending station for varying the current flow in said closed line circuit thereby to vary the magnetic strengths of said second windings, one of said relays being balanced magnetically and operated independently of the others to effect a selection over said prepared selecting circuits.

JOHN E. GARDNER.